United States Patent
Katsaros

(10) Patent No.: US 9,151,329 B2
(45) Date of Patent: Oct. 6, 2015

(54) MACHINE ASSEMBLY

(71) Applicant: Aktiebolaget SKF, Göteborg (SE)

(72) Inventor: Padelis Katsaros, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/322,965

(22) Filed: Jul. 3, 2014

(65) Prior Publication Data

US 2015/0010261 A1 Jan. 8, 2015

(30) Foreign Application Priority Data

Jul. 3, 2013 (DE) .......................... 10 2013 212 989

(51) Int. Cl.
| | |
|---|---|
| *F16C 33/60* | (2006.01) |
| *F16C 19/28* | (2006.01) |
| *B60B 27/00* | (2006.01) |
| *F16C 33/58* | (2006.01) |
| *F16C 19/38* | (2006.01) |
| *F16C 19/36* | (2006.01) |

(52) U.S. Cl.
CPC .............. *F16C 33/60* (2013.01); *B60B 27/001* (2013.01); *B60B 27/0094* (2013.01); *F16C 19/364* (2013.01); *F16C 19/385* (2013.01); *F16C 33/586* (2013.01); *B60B 27/0026* (2013.01)

(58) Field of Classification Search
CPC .... F16C 19/364; F16C 19/385; F16C 33/581; F16C 33/585; F16C 35/045; F16C 33/067; F16C 33/60; F16C 33/586; B60B 27/001; B60B 27/0026

USPC ................ 384/542–544, 548, 564–565, 571, 384/585–586, 589
See application file for complete search history.

(56) References Cited

U.S. PATENT DOCUMENTS

| | | | | |
|---|---|---|---|---|
| 1,927,534 | A * | 9/1933 | Wooler .......................... | 384/474 |
| 2,037,206 | A * | 4/1936 | Boden .............................. | 74/424 |
| 4,749,288 | A * | 6/1988 | Tilch et al. .................... | 384/584 |
| 4,990,000 | A * | 2/1991 | Harsdorff ...................... | 384/544 |
| 5,492,419 | A * | 2/1996 | Miller et al. .................. | 384/584 |
| 6,135,643 | A * | 10/2000 | Hattori et al. ................. | 384/589 |
| 6,287,015 | B1 * | 9/2001 | Komaba et al. ............... | 384/589 |
| 6,293,704 | B1 * | 9/2001 | Gradu .......................... | 384/585 |
| 6,857,786 | B2 * | 2/2005 | Csik ............................. | 384/589 |
| 7,419,306 | B2 * | 9/2008 | Miki et al. .................... | 384/477 |
| 7,857,521 | B2 * | 12/2010 | Umekida et al. .............. | 384/565 |
| 8,186,884 | B2 | 5/2012 | Henneberger | |
| 2002/0183156 | A1 * | 12/2002 | Gradu et al. .................. | 475/220 |
| 2003/0106384 | A1 * | 6/2003 | Yokota et al. .................. | 74/424 |
| 2007/0031079 | A1 * | 2/2007 | Komori et al. ............... | 384/589 |

FOREIGN PATENT DOCUMENTS

| | | | |
|---|---|---|---|
| DE | 9304615 | U1 | 5/1993 |
| DE | 20009069 | U1 | 10/2000 |

(Continued)

*Primary Examiner* — Marcus Charles
(74) *Attorney, Agent, or Firm* — Bryan Peckjian; SKF USA Inc. Patent Dept.

(57) ABSTRACT

A machine assembly includes a housing in which a shaft element is rotatably supported by a bearing assembly, the bearing assembly including two tapered roller bearings which are preloadable against each other and having at least one bearing outer ring and first and second bearing inner rings. The first bearing inner ring includes, in one of its axial end regions, a sleeve-shaped extension formed directly from the material of the first bearing inner ring, which sleeve-shaped extension directly contacts an end side of the second bearing inner ring.

14 Claims, 2 Drawing Sheets

(56) References Cited

FOREIGN PATENT DOCUMENTS

| DE | 20200240 U1 | 5/2002 |
| DE | 102005055995 A1 | 6/2007 |
| DE | 102008047819 A1 | 3/2010 |
| EP | 1443228 A1 | 8/2004 |
| JP | 2001336603 A * | 12/2001 ............. F16H 48/00 |
| WO | 03040578 A1 | 5/2003 |
| WO | 2006015289 A2 | 2/2006 |

* cited by examiner

MACHINE ASSEMBLY

CROSS-REFERENCE

This application claims priority to German patent application no. 10 2013 212 989.0 filed on Jul. 3, 2013, the contents of which are fully incorporated herein by reference.

TECHNOLOGICAL FIELD

The disclosure relates to a machine assembly having a housing in which a shaft element is rotatably supported by a bearing assembly. The bearing assembly includes two tapered roller bearings which are preloadable against each other, at least one bearing outer ring and bearing inner rings.

BACKGROUND

Such machine assemblies are used, for example, in motor-vehicle rear-axle differentials that have a pinion shaft supported in a housing. In these assemblies, the two tapered roller bearings are held at a defined spacing using spacer sleeves. It is important for the proper functioning of such an assembly that the two tapered roller bearings (usually positioned in an O-arrangement) be adjusted as precisely as practicable to a predefined axial preload. If the axial preload is too low, gear meshing problems can result, and this can lead to an increased noise level and increased gear wear. Too high a preload, on the other hand, leads to greater bearing friction, which manifests itself in, among other things, increased fuel consumption.

During a running-in or breaking in period of a machine or vehicle, various parts of the machine or vehicle may shift or adjust slightly as they settle into their final operating configuration. This may occur, for example, due to smoothening effects of the components involved, and this settling in may be noticeable in various fitted joints in a bearing assembly or machine assembly. After machine or vehicle start-up, (after the break-in period) a not-insignificant portion of an originally-set bearing preload may be lost over time due to this settling.

Since users tend to prefer reduced noise and wear to low friction, bearing preloads are often set to be higher than necessary. Accordingly a bearing preload is set higher than the expected preload decrease (preload loss following an initial period of operation); the consequently higher bearing friction is taken into account until the vehicle is "worn in." However, since the actual settling does not always correspond to the estimated expected amount of settling, the bearing assembly sometimes operates with an excess preload over the entire service life of the bearing. This disadvantageously results in an ongoing high level of friction and a higher-than-necessary fuel consumption.

SUMMARY

The object of the disclosure is to further develop a machine assembly of the above-described type such that this effect can be counteracted in a targeted manner. Accordingly it should be easier to hold a preset preload of the tapered roller bearing constant to an improved degree.

The solution of this object is characterized in that at least one of the bearing inner rings includes, in one of its axial end regions, a sleeve-shaped extension formed directly from the material of the bearing inner ring, which sleeve-shaped extension directly contacts the end side of the adjacent bearing inner ring.

The length of the sleeve-shaped extension—measured in the axial direction of the bearing Assembly—is preferably at least 75% of the length of the tapered rollers of the tapered roller bearing on which the sleeve-shaped extension is formed. The length of the sleeve-shaped extension is more preferably at least 100% of the length of these tapered rollers, and the sleeve-shaped projection preferably has a hollow-cylindrical shape.

A recess for an end side of the sleeve-shaped extension may be defined in the end side of the adjacent bearing ring, and the sleeve-shaped extension may contact a portion of this recess. However, this recess is by no means essential. Alternately, the end side of the adjacent bearing ring may be generally flat and have an projecting flange 13 that guides the sleeve-shaped projection.

The bearing outer ring for both tapered roller bearings can be formed one-piece, that is, as a single piece, and a particularly preferable embodiment provides that the bearing outer ring for both tapered roller bearings is formed directly by the housing. However, the bearing inner ring of one of the tapered roller bearings can be formed directly by the shaft element. In this case it is preferable that the shaft element has a cylindrical centering section configured to interact with a cylindrical inner surface of the sleeve-shaped extension.

The bearing inner ring of one of the tapered roller bearings can be provided with a flange, and the housing may be provided with an attachment flange.

The shaft element is preferably the pinion of a transmission, in particular of a bevel gear drive, especially preferably of a rear-axle differential of a motor vehicle.

The present disclosure is thus directed to reducing the settling of joints, e.g., during a break-in period, in a machine or vehicle that includes joints capable of settling ("settling joints"). While in prior-art embodiments a required axial spacing of a tapered roller bearing is maintained by spacer sleeves, in the present disclosure, a sleeve-shaped section formed on at least one bearing ring functions as a spacer sleeve. In this manner, a fitted-joint can be eliminated or omitted, and, consequently settling and thus a decrease of a preload can also be substantially reduced or eliminated.

It has been determined that an average settling amount of approximately 3 μm per contact point can be expected between two components during a running-in or break-in period. Reducing a number of fitted joints in a bearing according to the present teachings can thus lead to a quantifiable reduction in settling.

The flange-bearing inner ring is preferably integrated into a coupling flange, which in turn reduces the number of fitted-joints. The head-bearing inner ring can similarly be integrated into the pinion shaft, which in turn results a reduction of the number of settling joints. The same positive effect arises when the two bearing outer rings are integrated into the housing, and settling joints are thereby eliminated.

The preload loss is thus advantageously minimized so that from the time the bearing is first used, a relatively lower-friction, and consequently more environmentally friendly, operation of the machine assembly is possible.

The combination of components of the machine assembly advantageously further leads to a compact design, and the pinion bearing unit can thus be made shorter. This also results in a highly advantageous weight savings. A smaller number of components also allows for a simpler, faster, and thus more economical assembling of the assembly. The avoidance or prevention of tolerance chains is an equally positive effect of the proposed solution.

A pinion bearing unit including an integrated coupling flange or pinion shaft thus results.

Accordingly it is primarily provided that the two bearing inner rings contact each other axially. In this case the preload is adjusted by measuring and pairing the bearing rings. This means that before tightening the shaft nut, a certain precisely defined gap must be present between the inner rings, which gap disappears when the nut is tightened by its predefined maximum torque. The inner rings thus come into contact and the desired preload arises. Accordingly, after tightening the nut, the inner rings are clamped against each other.

However, the proposed solution can also be realized when it is carried out without contact of the bearing inner rings (with otherwise identical design of the bearing components, as described above). In this case the preload is determined by the specification of the tightening torque of the shaft nut. However, the length of the inner rings according to the above-described design is also important here, since the splines (interference-fit connections for transmission of a torque) integrated in the inner-ring bore require a certain length in order to transmit the very high drive torques. After tightening the nut a gap is then still present in the axial direction between the bearing inner rings.

BRIEF DESCRIPTION OF THE DRAWINGS

Exemplary embodiments of the invention are depicted in the drawings.

DETAILED DESCRIPTION

Figure 1:
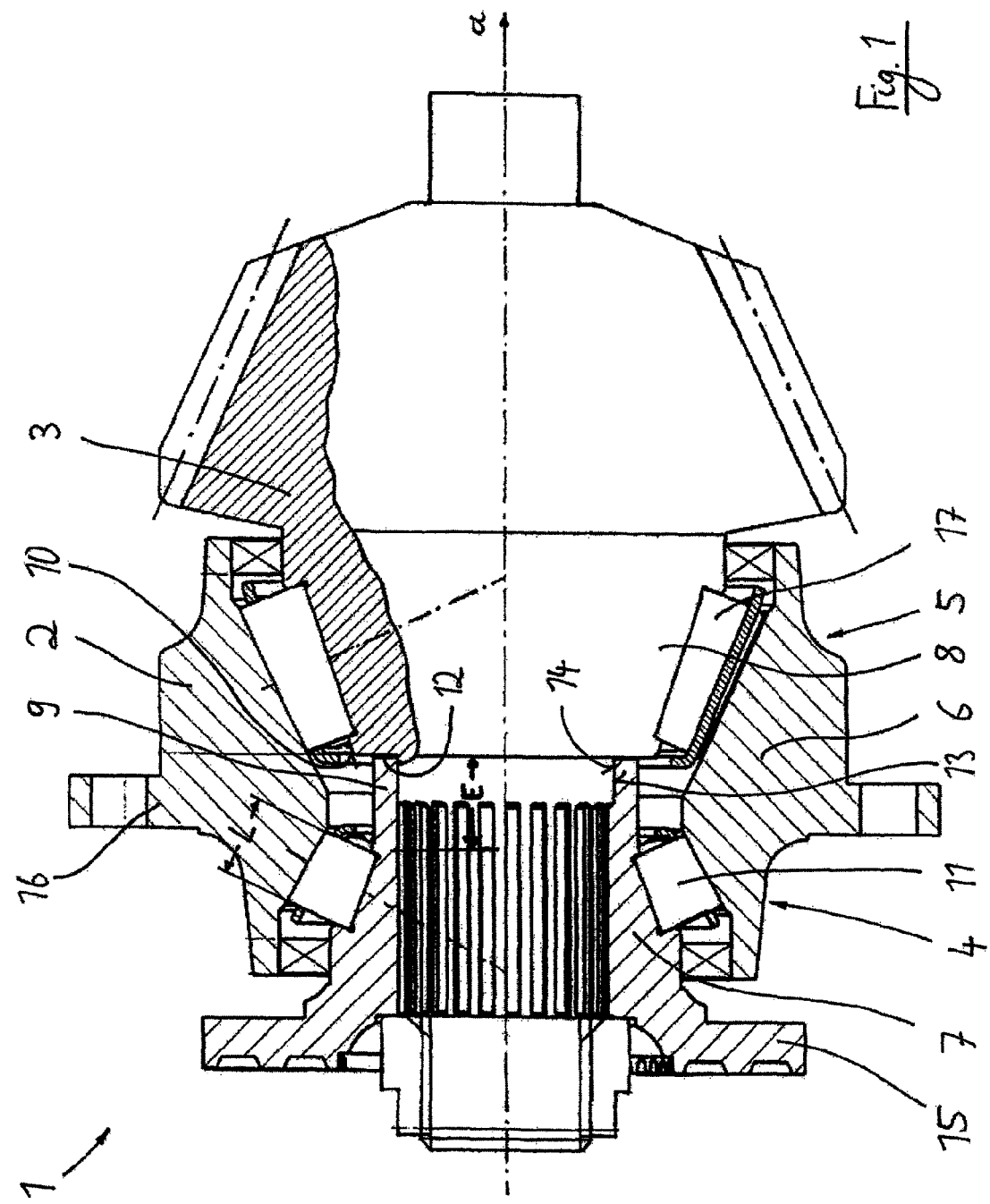
FIG. 1 is a radial sectional elevational view of a machine assembly including a bevel gear pinion supported in a housing.

FIG. 1 shows a machine assembly 1, in this case, a pinion bearing unit of a rear axle differential of a motor vehicle (truck). In a (rear-differential) housing 2 a shaft element 3 is supported, namely a bevel gear pinion shaft. The shaft element 3 is supported by a bearing assembly 4, 5 which includes two tapered roller bearings 4 and 5. These tapered roller bearings 4 and 5 are positioned in an 0-arrangement and include a common bearing outer ring 6 which is formed directly by the housing 2. Accordingly the two raceways for the tapered rollers 11 and 17 are directly ground into the housing 2.

The machine assembly 1 also includes two bearing inner rings 7 and 8. One of the bearing inner rings, namely the right-side bearing inner ring in FIG. 1, is formed directly by the shaft element 3. Accordingly the raceway for the tapered rollers 17 is ground directly into the shaft element 3.

It is important that at least one of the bearing inner rings—in the present case the bearing inner ring 7—includes, in one of its axial end regions, a sleeve-shaped extension 9 formed directly from the material of the bearing ring 7. This hollow-cylindrically formed extension 9 directly contacts—without a spacer sleeve—the end side 10 of the adjacent bearing ring 8.

A recess 12 is provided on the end side 10 of the bearing inner ring 8 for a defined abutment of the sleeve-shaped extension 9. The recess 12 can also perform a mutual centering or alignment function between the parts 8 and 9.

The sleeve-shaped section 9 extends in an axial direction a over a length E that corresponds to at least 75% of the length L of the tapered roller 11 of the tapered roller bearing 4. In the present embodiment the length E is approximately 120% of the length L. The length E is selected such that a spacer sleeve between the two bearing rings 7, 8 can be omitted (this plays a role in particular in the exemplary embodiment according to FIG. 2).

In the design according to FIG. 1 the bevel gear pinion shaft 3 has a cylindrical centering section 13 which is formed for precision-fit interaction with a cylindrical inner surface 14 of the sleeve-shaped extension 9. The recess 12 is located radially outward of this centering section 13.

The bearing inner ring 7 of the tapered roller bearing 4 includes a flange 15 directly formed thereon, and an attachment flange 16 is correspondingly formed on the housing 2.

The result is a very compact design which is characterized by a very small number of fitted joints between the components involved. The amount of settling during the running-in of the machine is accordingly low, and this helps maintain an initially-set preload.

Figure 2:
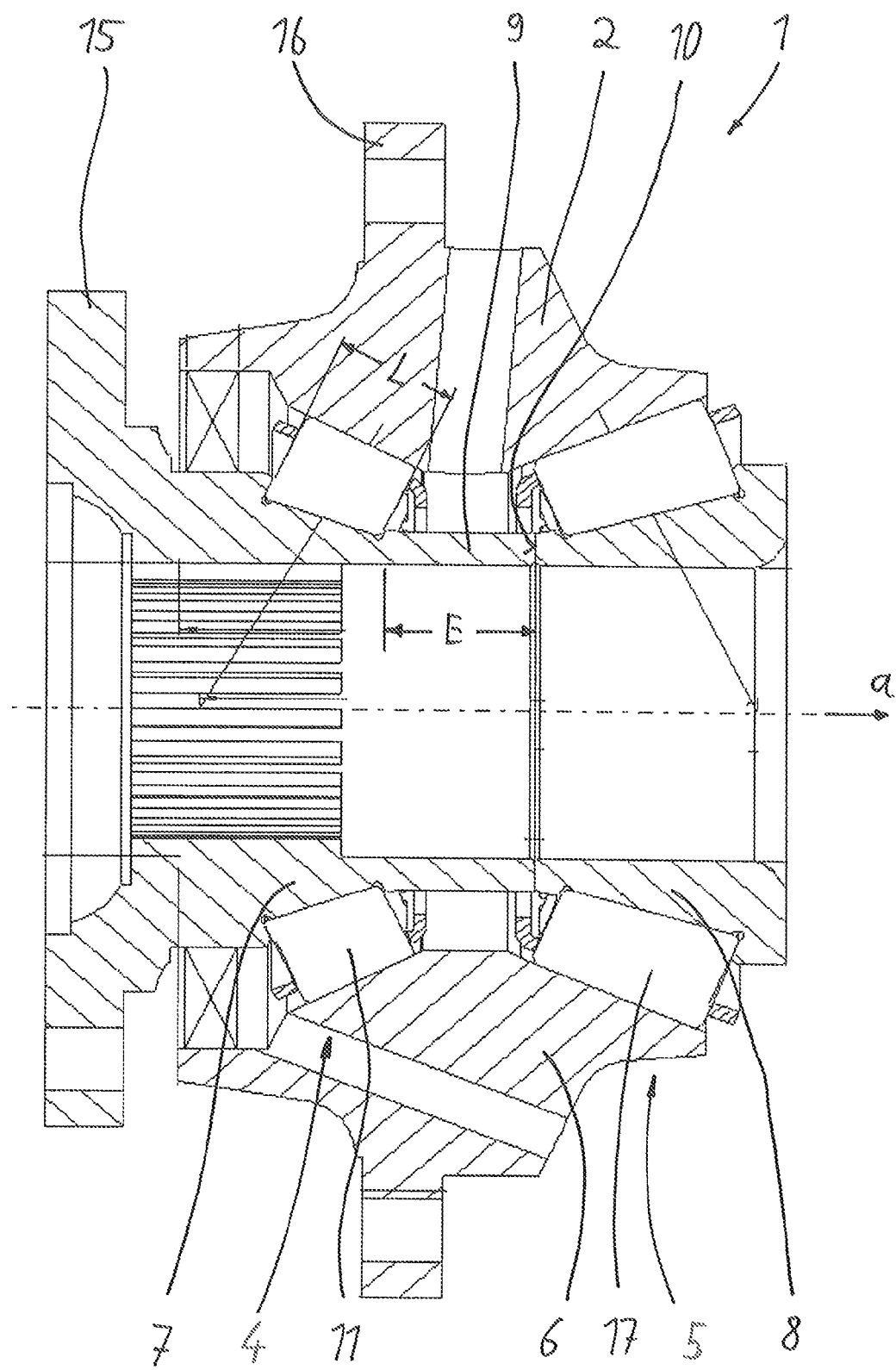
FIG. 2 is a radial sectional elevational view of an alternative embodiment of the housing of FIG. 1 in which the bevel gear pinion is not illustrated.

An alternative embodiment is depicted in FIG. 2. In this embodiment the bevel gear pinion shaft 3 is not directly formed as the bearing inner ring 8. Instead, it is formed as a separate component. Notwithstanding this difference, it is still essential that a sleeve-shaped extension 9 be formed on a bearing inner ring, again, in the present embodiment, on the left-side bearing inner ring 7.

The bearing assembly can be provided for grease lubrication or oil lubrication. Seals are disposed at the relevant locations.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved machine assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Machine assembly
2 Housing
3 Shaft element (bevel gear pinion shaft)
4, 5 Bearing assembly
4 Tapered roller bearing
5 Tapered roller bearing
6 Bearing outer ring
7 Bearing inner ring
8 Bearing inner ring 9 Sleeve-shaped extension
10 End side
11 Tapered roller
12 Recess
13 Cylindrical centering section
14 Cylindrical inner surface
15 Flange
16 Attachment flange
17 Tapered roller
a Axial direction
L Length of the tapered rollers
E Length of the sleeve-shaped extension

What is claimed is:

1. A machine assembly comprising a housing in which a shaft element is rotatably supported by a bearing assembly, the bearing assembly including two tapered roller bearings which are preloadable against each other, and the bearing assembly having at least one bearing outer ring and first and second bearing inner rings, wherein,
    the first bearing inner ring includes, in one of its axial end regions, a sleeve-shaped extension formed directly from the material of the first bearing inner ring, which sleeve-shaped extension directly contacts an end side of the second bearing inner ring,
    the end side of the second bearing inner ring includes a recess configured to receive an end side of the sleeve-shaped extension, the end side of the sleeve-shaped extension contacting a surface of the recess, and
    the shaft element has a cylindrical centering section configured to interact with a cylindrical inner surface of the sleeve-shaped extension.

2. The machine assembly according to claim 1, wherein a length (E) of the sleeve-shaped extension has, in an axial direction (a), at least 75% of a length (L) of tapered rollers of the tapered roller bearing.

3. The machine assembly according to claim 1, wherein the sleeve-shaped extension has a hollow-cylindrical shape.

4. The machine assembly according to claim 1, wherein the at least one bearing outer ring comprises a one-piece bearing outer ring formed directly by the housing.

5. The machine assembly according to claim 1, wherein one of the first and second bearing inner rings is formed directly by the shaft element.

6. The machine assembly according to claim 1, wherein the bearing inner ring of one of the tapered roller bearings includes a flange.

7. The machine assembly according to claim 1, wherein the housing includes an attachment flange.

8. The machine assembly according to claim 1, wherein the shaft element is the pinion of a transmission or a bevel gear drive or a rear axle differential of a motor vehicle.

9. The machine assembly according to claim 1, wherein a length (E) of the sleeve-shaped extension has, in an axial direction (a), at least 100% of a length (L) of tapered rollers of the tapered roller bearing.

10. The machine assembly according to claim 1, wherein
    a length (E) of the sleeve-shaped extension has, in an axial direction (a), at least 75% of a length (L) of tapered rollers of the tapered roller bearing,
    the sleeve-shaped extension has a hollow-cylindrical shape,
    the end side of the second bearing inner ring includes a recess configured to receive an end side of the sleeve-shaped extension, the end side of the sleeve-shaped extension contacting a surface of the recess,
    the at least one bearing outer ring comprises a one-piece bearing outer ring formed directly by the housing,
    one of the first and second bearing inner rings is formed directly by the shaft element, and
    the shaft element has a cylindrical centering section configured to interact with a cylindrical inner surface of the sleeve-shaped extension.

11. The machine assembly according to claim 10, wherein
    the bearing inner ring of one of the tapered roller bearings includes a flange,
    the housing includes an attachment flange, and
    the shaft element is the pinion of a transmission or a bevel gear drive or a rear axle differential of a motor vehicle.

12. A machine assembly comprising:
    a housing; and
    a shaft element rotatably supported in the housing by a bearing assembly,
    the bearing assembly including first and second tapered roller bearings preloaded against each other and having at least one bearing outer ring and first and second bearing inner rings, wherein,
    the first bearing inner ring includes a first axial end having a sleeve-shaped extension formed directly from the material of the first bearing inner ring, the sleeve-shaped extension directly contacting an end side of the second bearing inner ring,
    the second bearing inner ring further comprising a recess configured to receive an end side of the sleeve-shaped extension, the end side of the sleeve-shaped extension contacting a surface of the recess, and
    the end side of the second bearing inner ring includes a cylindrical wall configured to engage an inner side of the sleeve-shaped extension.

13. The machine assembly according to claim 12, wherein a length (E) of the sleeve-shaped extension is at least 75% of a length (L) of a tapered roller of the tapered roller bearing.

14. The machine assembly according to claim 12, wherein the sleeve-shaped extension is a hollow cylinder.

* * * * *